INVENTOR.
HARRY S. CLARK JR.

INVENTOR.
HARRY S. CLARK JR.

BY Schmieding and Fultz

ATTORNEYS

Dec. 26, 1961   H. S. CLARK, JR   3,014,333
CUTTER FOR ROTARY LAWNMOWER
Filed June 1, 1959   3 Sheets-Sheet 3
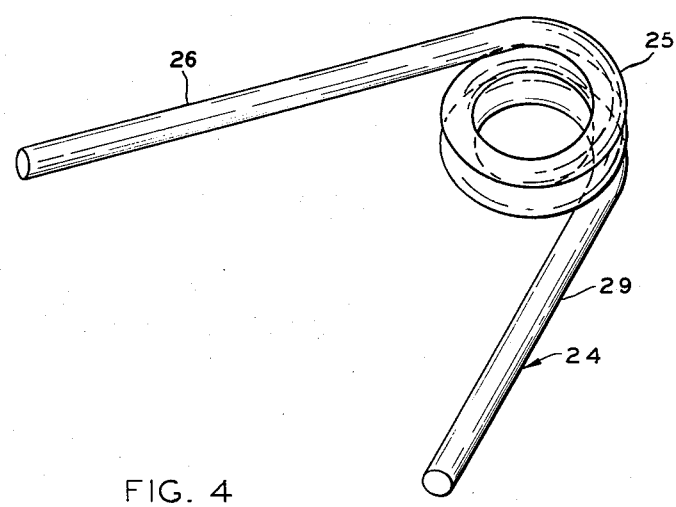
FIG. 4
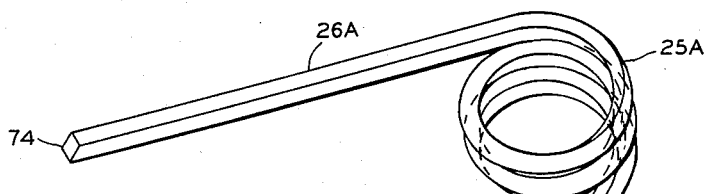
FIG. 5
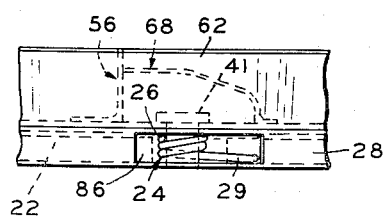
FIG. 6
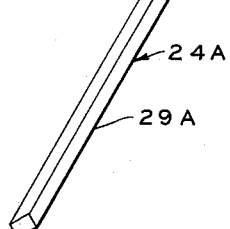
INVENTOR.
HARRY S. CLARK JR.
BY
ATTORNEYS United States Patent Office 3,014,333
Patented Dec. 26, 1961

3,014,333
CUTTER FOR ROTARY LAWNMOWER
Harry S. Clark, Jr., P.O. Box 314, Delaware, Ohio, assignor of twenty-four percent each to Palmer Fultz and Warren H. F. Schmieding, both of Columbus, Ohio
Filed June 1, 1959, Ser. No. 817,381
16 Claims. (Cl. 56—295)

This invention relates to lawnmowers and particularly to an improved safety cutter assembly for rotary type mowers.

In general, the apparatus of the present invention comprises a rotary supporting means herein shown as a plate that includes a central hub portion adapted to be mounted on the drive shaft of a rotary type power lawnmower. The rotary plate further includes a peripheral portion on which is mounted a plurality of wires that extend radially outwardly from the outer edge of said peripheral portion for severing engagement with blades of grass as the plate is rotated and moved across a lawn. It has been found that although the radially outwardly extending wires very effectively sever grass, weeds, and the like they are quite safe to use as severing means since unlike conventional rigid blades, provided with cutting edges, the wires will not cut through a person's shoe or sever his fingers. Moreover, since the wires are very light in weight, they do not constitute hazardous heavy whirling masses as do the relatively heavy sharpened rigid blades conventionally used on mowers of this type.

The wires of this invention are formed in a novel V-shaped configuration and mounted in a novel manner whereby the wires will not break upon encountering stones or other solid objects.

As another aspect of the present invention, the wires are removably mounted to the peripheral portion of the rotary plate by a novel mounting means that permits rapid removal and replacement of the wires without the use of tools.

As still another aspect of the present invention, the improved cutter assembly includes means for producing a radially outwardly and upwardly directed air flow, at the location of said wires, said air flow serving to cause blades of grass to stand upright so that the blades of grass can be effectively engaged and severed by the wires.

Further objects and advantages of the present invention will be apparent from the following description, reference being had to the accompanying drawings wherein preferred forms of embodiments of the invention are clearly shown.

In the drawings:

FIG. 4 is a perspective view of a wire severing element comprising a portion of the apparatus of the preceding figures, but on a larger scale;

FIG. 5 is a perspective view of a modified wire severing element constructed according to the present invention and comprising a modification thereof; and FIG. 6 is a fragmentary view looking in the direction of arrow 6 in FIG. 1.

Figure 1:
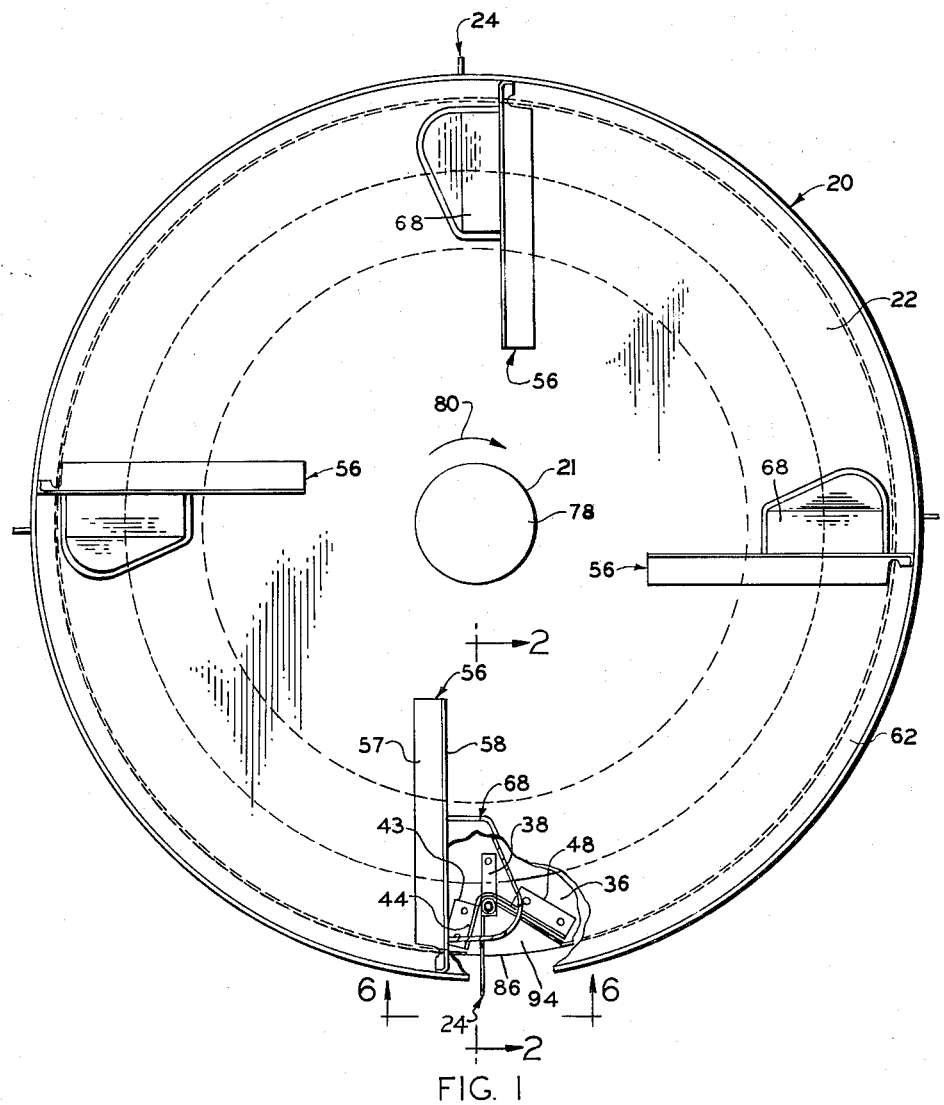
FIG. 1 is a top plan view of a cutter assembly constructed according to the present invention, parts thereof being broken away and a part is in section to show certain features of the invention.

Referring in detail to the drawings, FIG. 1 illustrates a cutter assembly constructed according to the present invention and including a horizontally disposed, rotary supporting means herein shown as including a horizontally disposed plate indicated generally at 20. Plate 20 includes a central hub portion 21 and a peripheral downwardly bulged housing portion 22.

A plurality of horizontally extending severing elements, each of which is indicated generally at 24, are mounted in the peripheral portion 22. Each of the severing elements 24 includes a coiled central portion 25, a first leg portion 26 that extends substantially radially and horizontally outwardly through a slot 86 in the outer peripheral edge 28 of plate 20, and a second leg portion 29, said two leg portions being integrally formed with said coiled central portion and extended therefrom in an angular configuration, as seen in FIGS. 1, 3, and 4.

Figure 2:
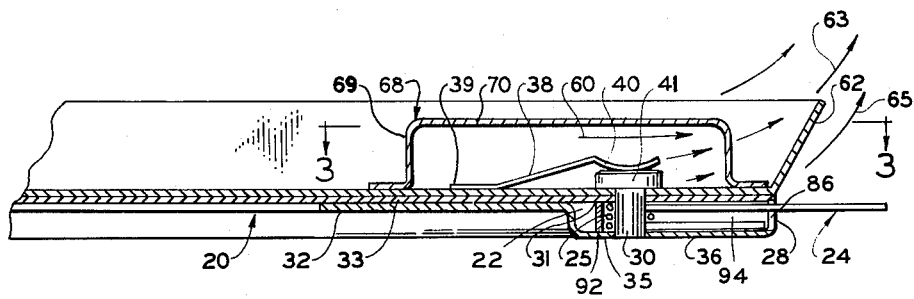
FIG. 2 is a fragmentary side sectional view of the cutter assembly of FIG. 1, but on a larger scale, and showing one of the radially extending wires and mounting means therefor, the section being taken along the line 2—2 of FIG. 1.
Figure 3:
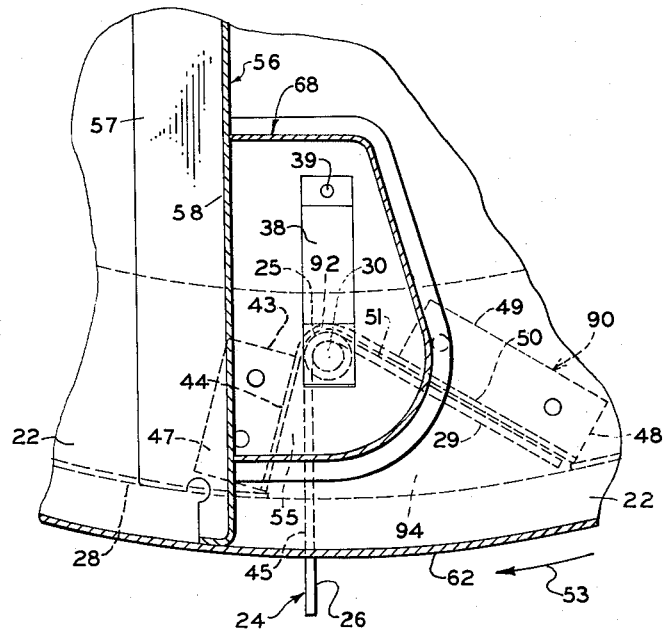
FIG. 3 is a fragmentary top sectional view of the wire and mounting means of FIG. 2, the section being taken along the line 3—3 of FIG. 2.

As is best illustrated in FIGS. 2 and 3, each of the severing elements 24 is mounted in portion 22 adjacent the peripheral edge 28 by a pin 30 extended through holes 31 in ring 32 and plate 33 of the composite plate 20, the coiled central portion 25 of cutter elements 24, and hole 35 in bottom wall 36 of the housing 22. A spring clip 38 is secured to plate 20 at 39 and includes an end 40 in spring pressed engagement with a head portion 41 of pin 30.

A cover member indicated generally at 68 includes a side wall 69, the base of which is secured to a circumferentially extending upturning flange 62 and a top wall 70 that limits the upward movement of spring clip 38 so that when pin 30 is pushed upwardly it cannot be moved completely out of hole 31.

With continued reference to FIG. 2, when it is desired to remove and replace severing element 24, any small pointed object, such as a nail or small screw driver tip, is pressed against the bottom end of pin 30 to move the bottom end above the top of coiled central portion 25 of severing element 24. The severing element is then free to be pulled radially outwardly and then be removed. Pin 30 is held in a raised configuration, against the downwardly pressed spring action of clip 38 while the new severing element 28 is installed by inserting the coiled central portion 25 under the bottom end of pin 30. If the pointed object is removed from hole 35, coiled central portion 25 is moved about until it is centered over hole 35 at which time spring clip 38 will push pin 30 downwardly to the position illustrated in FIG. 2.

With reference to FIGS. 1 and 3, a first stop means 43 includes a base flange 47 secured to the top surface of flange 36 and an up-turned flange portion 44 for engagement by a leading edge 45 on radially outwardly extending leg portion or stop 26 upon pivotal movement of severing element 24 about pin 30. These stops 44 limit the extent to which the severing elements can move in a clockwise direction about the pins 30, whereby the leading edges 45 of the legs 26 are always in position for cutting the grass.

A second stop means 48 includes a base flange 49 secured to the top of flange 36 and an up-turned flange portion 50 for engagement with a trailing edge 51 on leg portion 29 for the purpose of limiting the pivotal movement of severing element 24 about pin 30.

It has been discovered, in accordance with the present invention, that unless clearance is provided, between one of the leg portions 26 or 29, and its respective stop 44 or 50, the resilient spring steel wire, from which severing elements 24 are formed, will be broken when radially extending leg portion 26 encounters a rock or other solid object. With no clearance present between legs 26 and 29, and their respective stop means, when leg 26 encounters a solid object, it will be bent in a direction opposite to the direction of rotation, indicated by arrow 53, and toward leg portion 29. When leg portion 26 does engage the solid object it will be snapped violently by the energy stored in the resilient wire, against the upturned stop 44. If, however, a clearance space 55 is provided between one of the leg portions 26 or 29, and its respective stop, then when radially outwardly extending leg portion 26 encounters a solid object it will again be bent in a direction opposite to the direction of rotation 53 but when leg portion 26 is released by the solid object it will snap back to and only slightly beyond the normal V-shaped configuration illustrated in FIGS. 1 and 3. Hence, the energy stored in the resilient spring steel wire, when a severing element 24 encounters a solid object, cannot drive the leading edge 45 of leg portion 26 violently against up-turned stop 44 with the result that the severing elements 24 can withstand encountering solid objects without becoming broken by snap action.

With reference to FIG. 1, the top of plate 20 is provided with a plurality of substantially radially extending impeller members 56, each of which includes a base flange 57 and up-turned flange 58, the upper edge of which lies flush with the upper edge of flange 62. It will be understood that when plate 20 is rotated, the up-turned flange 58 on impeller members 56 create a radially outwardly directed flow of air as is indicated diagrammatically by arrow 60 in FIG. 2. As the flow of air reaches the peripheral portion of plate 20 it is deflected upwardly by the circumferentially extending up-turned flange 62, said upward deflection of the radial air flow being indicated diagrammatically by the arrow 63.

The upwardly directed air flow at 63 also creates an updraft or suction radially outwardly of up-turned peripheral flange 62 as is diagrammatically illustrated by arrow 65 in FIG. 2. This causes the blades of grass to stand upright whereby they can be effectively engaged and severed by cutter elements 24.

Reference is next made to FIG. 5 wherein a modified cutter element is indicated generally at 24A. The cutter element includes a coiled central portion 25A, a first leg portion 26A and a second leg portion 29A. Cutter element 24A differs from cutter element 24, previously described, in that the former is fabricated by bending wire of such shape in cross section that it provides an apex 74 forming the leading edge of leg portion 26A. In contrast, the spring steel wire used in forming cutter element 24 is of conventional round cross sectional shape.

In operation, the cutter assembly of FIG. 1 is mounted on a rotary type lawnmower by extending the drive shaft of the mower through a central hole 78 in rotary plate 20 and by securing said plate to said drive shaft by a suitable clamping means, not illustrated, such that rotation of the drive shaft of the mower rotates plate 20 in a direction of rotation indicated by the arrow 80 in FIG. 1 and again by arrow 53 in FIG. 3.

As plate 20 is rotated and the rotary mower is advanced across a lawn, cutter elements 24 are driven against the blades of grass. It is believed that cutter elements 24 sever the blades of grass by breaking or cutting said blades or a combination of breaking and cutting.

As the mower proceeds across the lawn, if a solid object, such as a rock, is encountered, cutter elements 24 will yield rearwardly, against the direction of rotation and then released whereby radially outwardly extending leg portions 26 will be moved in the direction of rotation of the plate, by the inherent resiliencies of the wires, and, although there is a clearance space for forward movement of the leg portion 26, such portion will not be driven violently forwardly against the stop 44 for two reasons, first, the portion will engage grass, as the mower moves forwardly, which engagement will impede such forward movement of the leg portion 26, and second, the momentum is decelerated before the portion strikes the stop, but will not be driven violently forwardly against the stop 44 due to the provision of clearance space 55 between the leading edge 45 of leg portion 26 and its respective stop.

In the event the mower encounters a patch of fine grass, such as is commonly found at the base of a tree, the upwardly directed air flow 63 and 65, FIG. 2, will lift said fine blades of grass to an upright position wherein they can be engaged and severed by severing elements 24.

From the foregoing, it will be seen that each of the severing elements has a cutting edge 45 along the leg portion 26, a portion 29, which provides a movement limiting means for the element, and an intermediate portion yieldingly biased into a curve (herein shown as a coil) which curve provides an elongated section through which substantially all bending action takes place. Being elongated, severe breaking stresses are not impressed on any short section of the wire, thus eliminating breaking which would occur if bending movement were concentrated over a short length of the wire.

The preferred embodiment, I desire to make stop legs 26 and 29 of equal length whereby should the end of leg 26 break away, the element can be reversed so that the end portion, which was previously used as a severing edge, now forms an element movement limiting portion, and, the end portion, which was previously used as the element movement limiting portion, now provides the severing edge.

A further advantage of the present invention lies in the fact that each severing edge remains substantially constant in sharpness, since it yields rearwardly to objects that would, except for such yielding, flatten the severing edge and thereby dull same as occurs in the use of commercial non-yielding blades.

A still further advantage of the rearwardly yielding blades lies in the fact that when the blades engage a staunch object, such as a stone, tree trunk, etc., there is no tendency to impart bending or distoring impact to the shaft of the motor as occurs in the use of commercial non-yielding blades.

While centrifugal force tends to throw grass clippings outwardly, yet I assure the prevention of entrance of foreign matter into the peripherally disposed housing 22 by bringing the flanges 44 and 50 into abutting relationship inwardly of the coil of the spring or by forming the flanges 44 and 50 as an integral structure 90 having a joining wall 92 to form sub-housing structures 94. Each of these sub-housings 94 is provided with the slot 86 through which the cutting end of the wire extends. Thus foreign matter cannot enter the housing 22, which foreign matter, if permitted to enter the housing, would cause an unbalanced condition, resulting in wobling, and in consequent wear of the motor shaft and its bearing.

It will be observed from FIGS. 1 and 6 that the trailing end of the cover slants downwardly in a streamline shape to enhance the efficiency of the impeller members 56.

While I have referred to the present invention as a lawnmower, it is to be understood that the word lawnmower includes all types of mowers. For example, if the mower is used for cutting grass and the usual weeds that are found in lawns, the severing elements 24 are formed of piano wire of approximately .032 of an inch diameter.

When used for cutting heavier stalks, I prefer to use piano wire of approximately .070 of an inch diameter.

While the forms of embodiments of the present invention as herein disclosed constitutes preferred forms, it is to be understood that other forms might be adopted, all coming within the scope of the claims which follow.

I claim:

1. An improved cutter assembly for a rotary lawnmower comprising, in combination, horizontally disposed, rotary supporting means including a central hub portion and a peripheral portion; a plurality of wires mounted on said means each of said wires having an end extended outwardly from said peripheral portion; and means on the rotary means for producing an upwardly directed flow of air at said peripheral portion adjacent the extended ends of said wires.

2. An improved cutter assembly for a rotary lawnmower comprising, in combination, horizontally disposed, rotary supporting means including a central hub portion and a peripheral portion; a pin mounted on said means adjacent said peripheral portion; a resilient wire including a central portion wrapped around said pin, a first leg portion extending horizontally outwardly from said peripheral portion, nad a second leg portion extending outwardly from said pin; and first and second stop means, respectively, for said leg portions, said wire being rotatable, in a limited arc, about said pin and between said stop means.

3. The cutter assembly of claim 2 wherein said first leg portion includes a leading edge that engages said first stop means and said second leg portion includes a trailing edge that engages said second stop means.

4. An improved cutter assembly for a rotary lawnmower comprising, in combination, a rotary supporting means including a central hub portion and a peripheral portion provided with a hole; a pin mounted in said hole and shiftable between a wire mounting position and a wire releasing position; resilient means engaging said pin and yieldingly holding said pin in said hole; a resilient wire including a central portion wrapped around said pin, a first leg portion extending outwardly fro msaid peripheral portion, and a second leg portion extending outwardly from said pin; and first and second stop means for said leg portions, said wire being rotatable, in a limited arc, about said pin and between said stop means.

5. An improved cutter assembly for a rotary lawnmower comprising, in combination, horizontally disposed rotary means including a central hub portion and a peripheral portion; a wire mounted on said rotary means and having an end extended radially and horizontally outwardly from said peripheral portion; means for producing an outwardly directed flow of air along said rotary means; and means on said peripheral portion for deflecting said flow of air upwardly adjacent said extended end of said wire.

6. An improved cutter assembly for a rotary lawnmower comprising, in combination, horizontally disposed rotary supporting means including a central hub portion and a peripheral portion; a wire mounted on said rotary means and having an end extended outwardly and horizontally from said peripheral portion; means forming a radially extending impeller on the upper surface of said supporting means for producing an outwardly directed flow of air; and means on the supporting means for directing said flow upwardly adjacent said extended end of said wire.

7. An improved cutter assembly for a rotary lawnmower comprising, in combination, horizontally disposed rotary supporting means including a central hub portion and a peripheral portion; a wire mounted on said rotary means and having an end extended outwardly and horizontally from said peripheral portion, said peripheral portion including an up-turned flange for directing said flow of air upwardly adjacent said extended end of said wire, said up-turned flange forming a continuous annular surface said end of the wire extending horizontally outwardly beyond said flange; and means forming a radially extending blade on the upper surface of said supporting means for producing a radially outwardly directed flow of air.

8. An improved cutter assembly for a rotary lawnmower comprising, in combination, horizontally disposed rotary supporting means including a central hub portion and a peripheral portion; a wire mounted on said rotary means and having an end extended outwardly and horizontally from said peripheral portion, said wire including an apex formed on the leading edge thereof; and means for producing an upwardly directed flow of air at said peripheral portion adjacent extended end of said wire.

9. A severing element for a rotary lawnmower comprising a length of resilient wire including a coiled central portion and integral leg portions of like configuration extended outwardly from said coiled central portion.

10. A severing element for a rotary lawnmower comprising a length of resilient wire including a coiled central portion and integral leg portions extended outwardly from said coiled central portion, certain of said leg portions including an apex formed on a leading edge thereof.

11. A severing element for a rotary mower comprising a wire formed of resilient material, one end portion of the wire forming a cutting edge along the length thereof, the other end portion of the wire being of like configuration as the first mentioned end portion and providing a movement limiting means for the wire, and an intermediate portion of the wire being yieldingly biased into a curve.

12. An improved cutter assembly for a rotary lawnmower comprising, in combination, rotary supporting means having a circular housing adjacent the periphery thereof, a plurality of sub-housings within the circular housing, said sub-housings each having a slot; and a wire severing element in each of said sub-housings, said element extending through the slot and beyond the periphery of the rotary supporting means.

13. An improved cutter assembly for a rotary lawnmower comprising, in combination, a horizontally disposed supporting means including a central hub portion and a peripheral portion; pins mounted on said means adjacent said peripheral portion; a plurality of grass severing means, each including a resilient portion, each of said resilient portions being rotatable, respectively, about one of said pins, and each severing means including a pair of resilient wire leg portions, one of said leg portions extending in different directions from said resilient portion; a backing stop for the other of said legs, limiting arcuate movement of the severing means in one direction and for maintaining, said one leg portion extended into grass severing position, said severing means being arcuately movable in the opposite direction; and a second stop for maintaining said one leg portion extended into grass severing position, said last mentioned stop being disposed for providing limited arcuate movement of said one leg portion counter to said aforementioned one direction.

14. An improved cutter assembly as defined in claim 13, in which the resilient portion comprises a coil of resilient wire and the leg portions are co-extensive, integral portions at opposite ends of the coil.

15. An improved cutter assembly for a rotary lawnmower comprising, in combination, a horizontally disposed supporting means including a central hub portion and a peripheral portion; pins mounted on said means adjacent said peripheral portion; a plurality of grass severing means, each including a resilient portion, each of said resilient portions being rotatable, respectively, about said one of said pins, and each severing means including a pair of resilient wire leg portions, one of said leg portions extending horizontally from said resilient portion and beyond the peripheral portion, said leg portions extending in different directions from said resilient portions; and first and second stops on the supporting means, for said leg portions, said resilient leg portions being rotatable, in a limited arc, about a pin and between said stops.

16. A severing element for a rotary lawnmower comprising a resilient supporting portion and a pair of legs of wire of like configuration extending outwardly and in different directions from said resilient supporting portions.

References Cited in the file of this patent

UNITED STATES PATENTS

| | | |
|---|---|---|
| 2,707,859 | Walker | May 10, 1955 |
| 2,720,071 | Watanabe | Oct. 11, 1955 |
| 2,762,188 | Klein | Sept. 11, 1956 |
| 2,867,963 | Lawrence et al. | Jan. 13, 1959 |

FOREIGN PATENTS

| | | |
|---|---|---|
| 1,058,467 | France | Nov. 4, 1953 |